United States Patent
Iannotta et al.

(10) Patent No.: US 11,360,333 B2
(45) Date of Patent: Jun. 14, 2022

(54) SUNGLASSES SHADE ATTACHMENT

(71) Applicants: Stephen Iannotta, Naples, FL (US); Ronda Bromm, Tekamah, NE (US)

(72) Inventors: Stephen Iannotta, Naples, FL (US); Ronda Bromm, Tekamah, NE (US)

(*) Notice: Subject to any disclaimer, the term of this patent is extended or adjusted under 35 U.S.C. 154(b) by 354 days.

(21) Appl. No.: 16/730,966

(22) Filed: Dec. 30, 2019

(65) Prior Publication Data
US 2020/0209650 A1 Jul. 2, 2020

Related U.S. Application Data

(60) Provisional application No. 62/786,251, filed on Dec. 28, 2018.

(51) Int. Cl.
*G02C 7/16* (2006.01)
*G02C 9/04* (2006.01)
*G02C 7/10* (2006.01)

(52) U.S. Cl.
CPC ............... *G02C 7/16* (2013.01); *G02C 9/04* (2013.01); *G02C 7/10* (2013.01)

(58) Field of Classification Search
CPC ..... G02C 7/16; G02C 9/04; G02C 7/10; G02C 11/12; G02C 11/00
USPC ............................................. 351/41, 44, 47
See application file for complete search history.

(56) References Cited

U.S. PATENT DOCUMENTS

| | | |
|---|---|---|
| D338,099 S | 8/1993 | Gentile |
| 5,528,800 A | 6/1996 | Kliot |
| 6,032,292 A * | 3/2000 | Wood ................. A41D 23/00 2/9 |
| 6,247,180 B1 | 6/2001 | Heinz |
| 7,131,148 B1 | 11/2006 | Traumer |
| 2013/0180021 A1 | 7/2013 | Danner |
| 2015/0261014 A1 | 9/2015 | Nodtvedt |

\* cited by examiner

*Primary Examiner* — Tuyen Tra
(74) *Attorney, Agent, or Firm* — Michael C. Balaguy

(57) ABSTRACT

A shade attachment for sunglasses; the shade attachment includes a shade body, and a looped-section defining a sleeve having a first opening and a second opening configured to receive and retain arms of the sunglasses. The shade attachment for sunglasses is useful for providing shade and preventing sun exposure to the neck, head and facial area of the user.

10 Claims, 4 Drawing Sheets

SUNGLASSES SHADE ATTACHMENT

CROSS-REFERENCE TO RELATED APPLICATION(S)

The present application is related to and claims priority to U.S. Provisional Patent Application No. 62/786,251 filed Dec. 28, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of sunshades of existing art and more specifically relates to a shade attachment for sunglasses.

RELATED ART

Many people wear sunscreen. It can be frustrating and inconvenient to constantly apply and reapply sunscreen throughout the day, especially on the delicate face and neck areas. If people don't apply sunscreen on a regular schedule, they may suffer from painful sunburns; flaky, peeling skin; and potential sun damage over time. Thus, a suitable solution is desired.

U.S. Publication. No. 2013/0180021 to John Adam Danner relates to a fabric sunshade accessory for glasses. The described fabric sunshade accessory for glasses includes a piece of fabric and is provided with at least one passageway having a pair of open ends. The passageway is located adjacent to or near an edge of the sunshade for receiving the temples of the glasses to attach the sunshade to the glasses. When the glasses and sunshade are worn by a person a portion of the passageway is disposed on a back side of the head of the person and the sunshade extends downward to shade at least a portion of a neck of the person.

SUMMARY OF THE INVENTION

In view of the foregoing disadvantages inherent in the known sunshade attachment art, the present disclosure provides a novel sunglasses shade attachment. The general purpose of the present disclosure, which will be described subsequently in greater detail, is to provide a sunshade for attachment to sunglasses and for use in shading a head, neck, and facial area of a user.

A shade attachment for sunglasses is disclosed herein. The shade attachment includes a shade body which may include at least one layer being made from a flexible material, the shade body may include a substantially rectangular configuration having a top side, a left side, a right side, and a bottom side relative to a user wearing the sunglasses. The top side may include a looped-section formed by the top side being folded and secured to the at least one layer. The looped-section may define a sleeve having a first opening and a second opening, the first opening being sized to removably receive and retain a first arm of the sunglasses in the sleeve, and the second opening being sized to removably receive and retain a second arm of the sunglasses in the sleeve.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a sunglasses shade attachment, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a sunshade attachment and more particularly to a sunglasses shade attachment as used to improve sunglasses use.

Generally disclosed is a sunshade made from a fabric material that is preferably washable, lightweight, breathable and UV-resistant. In one embodiment the fabric material may be a nylon/spandex blend. The sunshade may include two sleeves integral to the sunshade for inserting sunglasses' arms therein. Preferably, the fabric material may be stretchy so that it fits various sizes of sunglasses. In use, the shade may extend over the wearer's ears and around their neck and may taper downward along the neck. The sunshade may further include an unbroken loop fabric (UBL) layer. A hook patch may also be provided on the sunshade to allow a user to wrap the sunshade around their face and secure it to the UBL layer.

Referring now more specifically to the drawings by numerals of reference, there is shown in FIGS. 1-4B, various views of a shade attachment for sunglasses 100.

Figure 1:
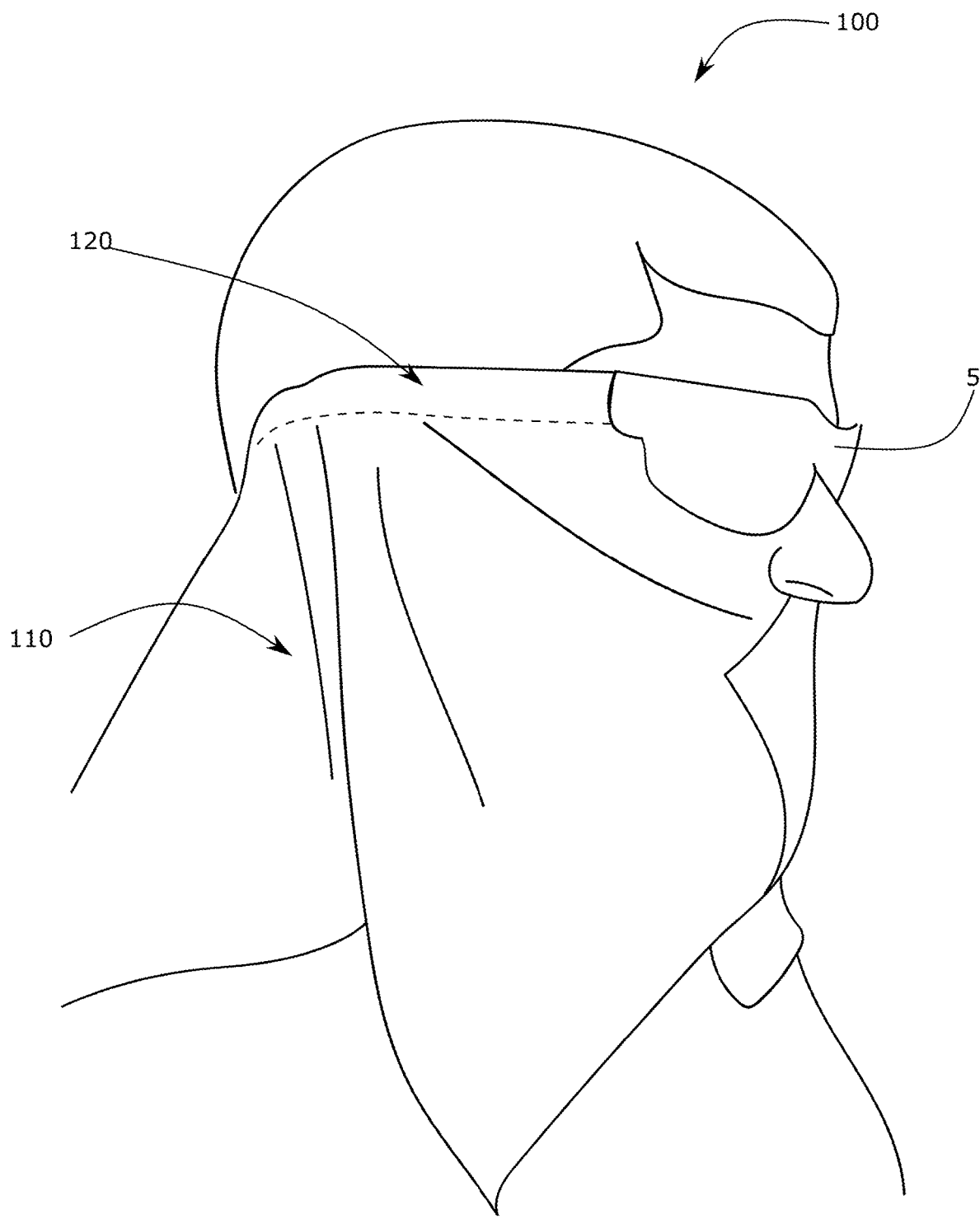
FIG. 1 is a front side view of the shade attachment for sunglasses during an 'in-use' condition, according to an embodiment of the disclosure.

FIG. 1 shows a shade attachment for sunglasses during an 'in-use' condition 50, according to an embodiment of the present disclosure. Here, the shade attachment for sunglasses may be beneficial for use by a user to provide the user with a means of preventing exposure to the sun for the neck, head and face area. As illustrated, the shade attachment for sunglasses 100 may include a shade body 110, and a looped-section 120. The shade attachment 100 may be used with sunglasses 5.

Figure 2A:
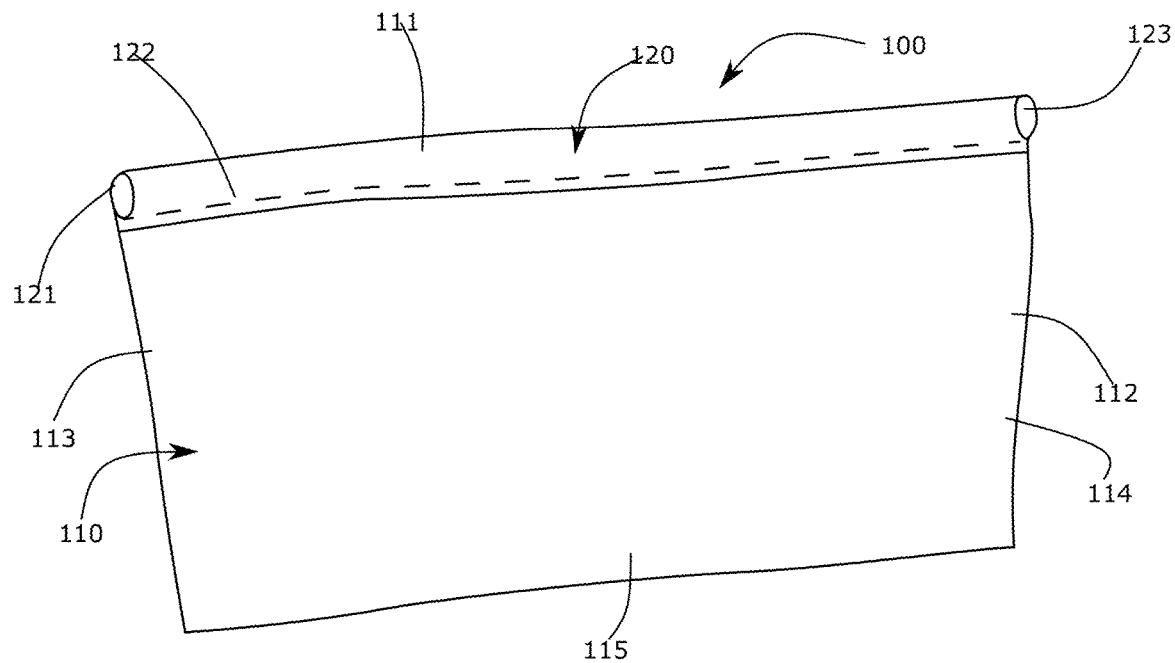
FIG. 2A is a front view of the shade attachment for sunglasses of FIG. 1, according to an embodiment of the present disclosure.
Figure 2B:
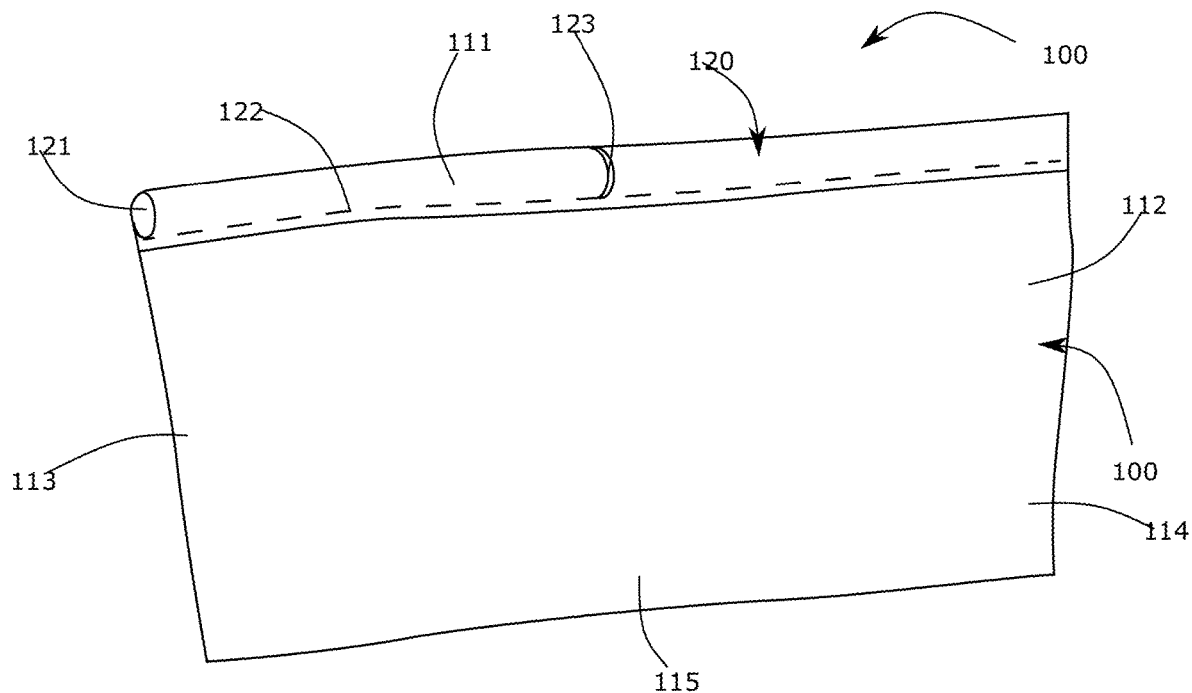
FIG. 2B is a front view of the shade attachment for sunglasses of FIG. 1, according to an embodiment of the present disclosure.
Figure 3:
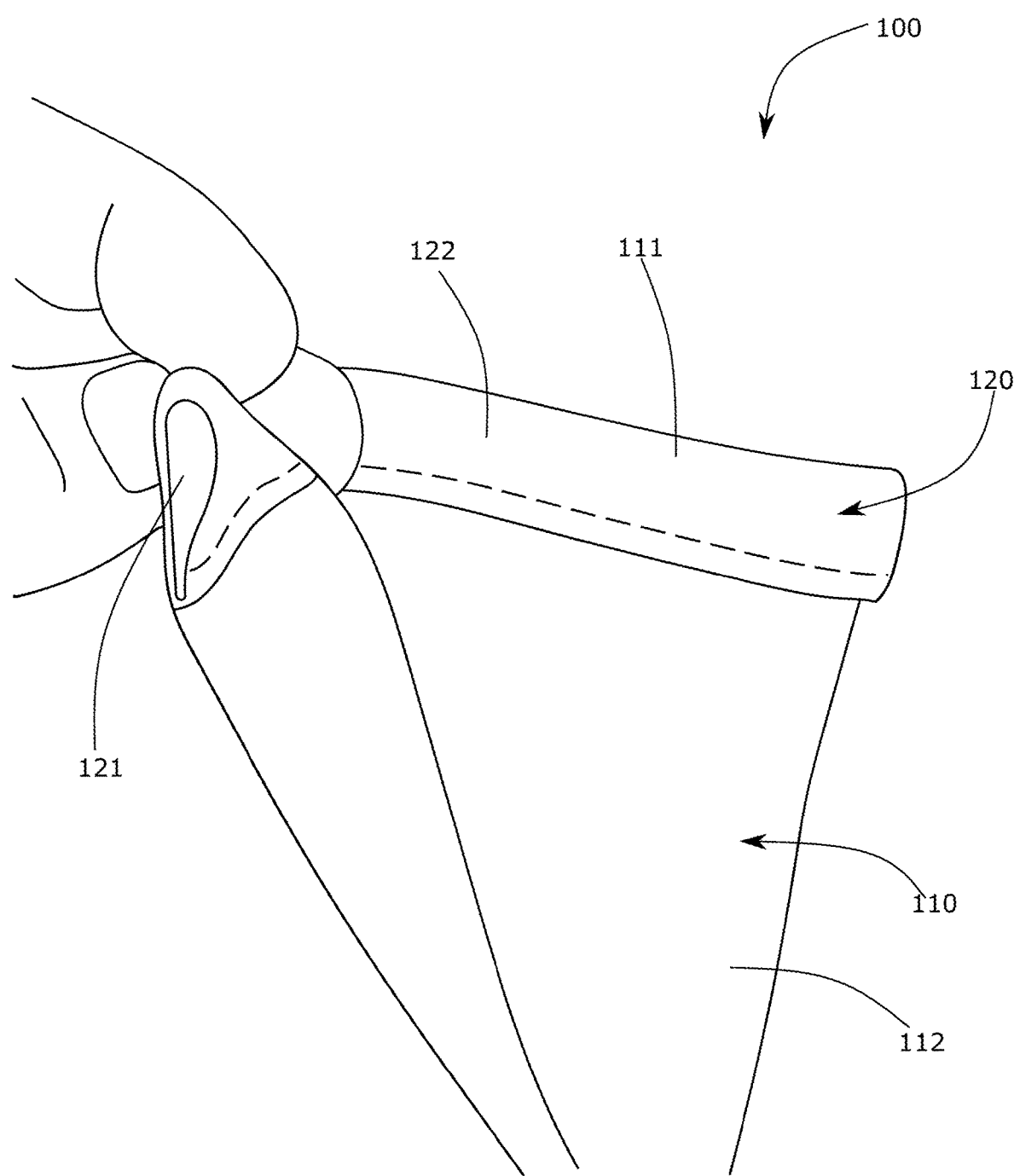
FIG. 3 is a side view of the shade attachment for sunglasses of FIG. 1, according to an embodiment of the present disclosure.

FIGS. 2A-3 are front and side views of the shade attachment for sunglasses of FIG. 1, according to an embodiment of the present disclosure. The shade body 110 may include at least one layer 112 being made from a flexible material. Preferably, the flexible material may be a nylon spandex blend that is stretchable enough to accommodate a variety of differently sized sunglasses 5 (FIG. 1). It should be appreciated that the flexible material may be any combination of stretchable fabrics, whether synthetic or natural and is not limited to the nylon spandex blend. Further, the flexible material may be particularly useful for cleaning the sunglasses 5 (FIG. 1). As shown, the shade body 110 may include a substantially rectangular configuration having a top side 111, a left side 113, a right side 114, and a bottom side 115 relative to a user wearing the sunglasses 5 (FIG. 1).

The top side 111 of the shade body 110 may include the looped-section 120 formed by the top side 111 being folded and secured to the at least one layer 112. In one embodiment, the top side 111 may be folded and sewn to the at least one layer 112. The looped-section 120 may define a sleeve 122 having a first opening 121 and a second opening 123, the first opening 121 being sized to removably receive and retain a first arm of the sunglasses 5 (FIG. 1) in the sleeve 122, and the second opening 123 being sized to removably receive and retain a second arm of the sunglasses 5 (FIG. 1) in the sleeve 122. As above, the shade body 110 may be made from the flexible material which may accommodate a variety of sunglass sizes. Thus, an inner capacity of the sleeve 122 may stretch in size.

In one embodiment, the first opening 121 may be located at a first-end of the looped-section 120 at the left side 113 of the at least one layer 112, and the second opening 123 may be located at a second-end of the looped-section 120 at the right side 114 of the at least one layer 112. In another embodiment, the first opening 121 may be located at the first-end of the looped-section 120 at the left side 113 of the at least one layer 112, and the second opening 123 may be located along a length of the looped-section 120.

Figure 4A:
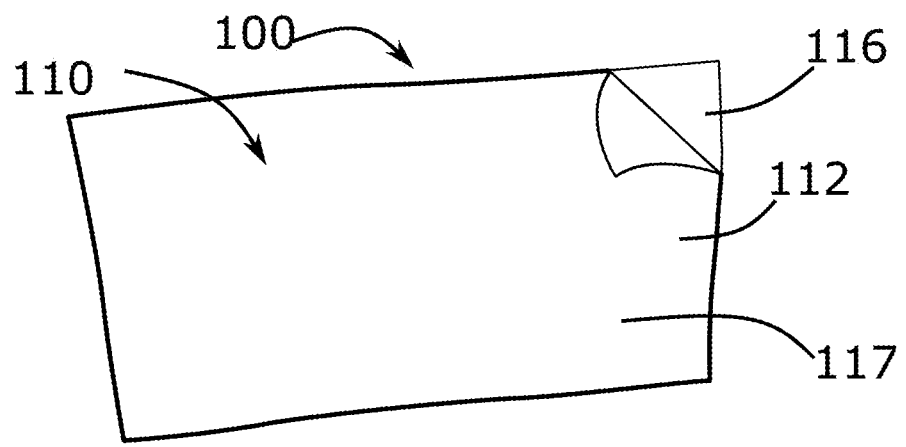
FIG. 4A is a front side view of the shade attachment for sunglasses of FIG. 1, according to an embodiment of the present disclosure.
Figure 4B:
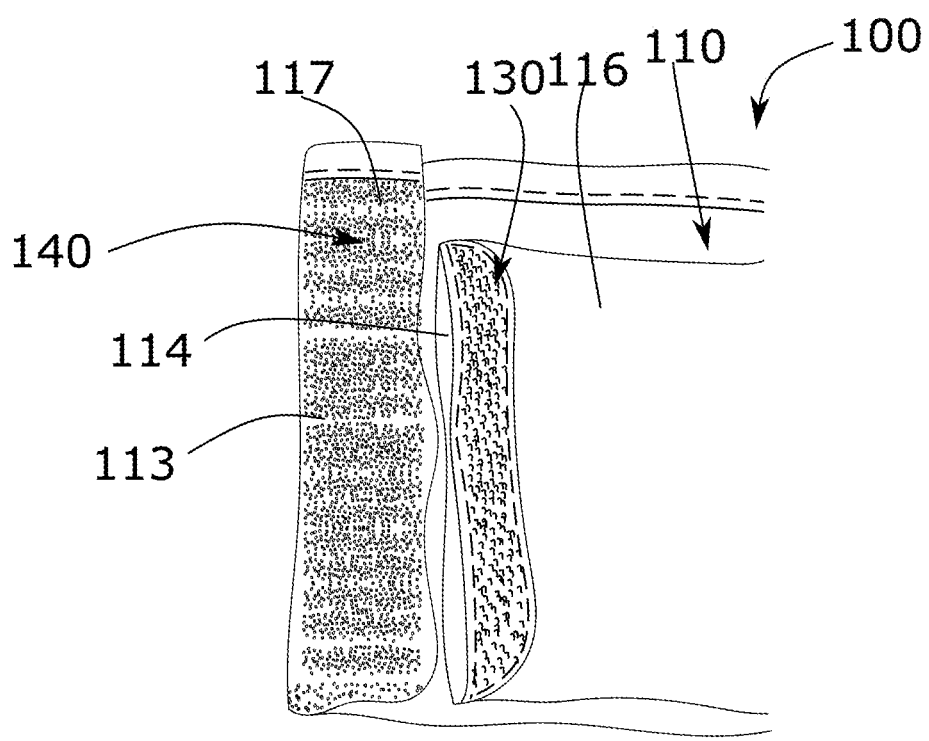
FIG. 4B is a front view of the shade attachment for sunglasses of FIG. 1, according to an embodiment of the present disclosure.

FIGS. 4A-4B are front side and front views of the shade attachment for sunglasses of FIG. 1, according to an embodiment of the present disclosure. FIG. 4B shows the shade attachment 100 folded to illustrate the right side 114 and the left side 113. The right side 114 of the shade body 110 may include a first fastening means 130. In this embodiment, the right side 114 of the shade body 110 may be configured to wrap around a face of the user wearing the sunglasses 5 (FIG. 1), and the first fastening means 130 may be configured to attach the right side 114 of the shade body 110 to the left side 113. In one embodiment, the at least one layer 112 may include at least two layers. FIG. 4A shows a peeled back layer to illustrate this, but it should be appreciated this is for illustrative purposes only and the shade attachment 100 is not envisioned to have peel-able layers. The at least two layers may include an inner layer 116 and an outer layer 117, and the outer layer 117 may include a second fastening means 140. The first fastening means 130 may be attached to the inner layer 116 of the at least two layers 112. Preferably, the second fastening means 140 may be unbroken loop fabric and the first fastening means 130 may include a hook fabric material configured to mate with the unbroken loop fabric. The outer layer 117 may be made from the unbroken loop fabric, or may include a portion of the unbroken loop fabric.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A shade attachment for sunglasses, the shade attachment comprising:
    a shade body including at least two layers, the at least two layers including an inner layer and an outer layer, the outer layer comprising a second fastening means, the shade body having a substantially rectangular configuration including a top side, a left side, a right side, and a bottom side relative to a user wearing the sunglasses, wherein the top side includes a looped-section formed by the top side being folded and secured to the at least one layer, the looped-section defining a sleeve having a first opening and a second opening, the first opening being sized to removably receive and retain a first arm of the sunglasses in the sleeve, and the second opening being sized to removably receive and retain a second arm of the sunglasses in the sleeve; and
    a first fastening means attached to the inner layer about the right side of the shade body, wherein the right side of the shade body is configured to wrap around a face of the user wearing the sunglasses, and wherein the first fastening means is configured to attach the right side of the shade body to the left side.

2. The shade attachment of claim 1, wherein the second fastening means is unbroken loop fabric.

3. The shade attachment of claim 2, wherein the first fastening means includes a hook fabric material configured to mate with the unbroken loop fabric.

4. The shade attachment of claim 1, wherein the first opening is located at the first-end of the looped-section at the left side of the at least one layer, and wherein the second opening is located along a length of the looped-section.

5. The shade attachment of claim 1, wherein the inner layer includes a nylon spandex blend.

6. The shade attachment of claim 1, wherein the top side is folded and sewn to the at least one layer.

7. A shade attachment for sunglasses, the shade attachment comprising:
    a shade body including at least two layers, the at least two layers including an inner layer and an outer layer, the outer layer having a second fastening means being made from unbroken loop fabric, the shade body having a substantially rectangular configuration including a top side, a left side, a right side, and a bottom side relative to a user wearing the sunglasses, wherein the top side includes a looped-section formed by the top side being folded and secured to the at least one layer, the looped-section defining a sleeve having a first opening and a second opening, the first opening being sized to removably receive and retain a first arm of the sunglasses in the sleeve, and the second opening being sized to removably receive and retain a second arm of the sunglasses in the sleeve; and a first fastening means attached to the inner layer about the right side of the shade body, the first fastening means including a hook fabric configured to mate with the unbroken loop fabric, wherein the right side of the shade body is configured to wrap around a face of the user wearing the sunglasses, and wherein the first fastening means is configured to attach the right side of the shade body to the left side.

8. The shade attachment of claim 7, wherein the first opening is located at the first-end of the looped-section at the left side of the at least one layer, and wherein the second opening is located along a length of the looped-section.

9. The shade attachment of claim 7, wherein the inner layer includes a nylon spandex blend.

10. The shade attachment of claim 7, wherein the top side is folded and sewn to the at least one layer.

\* \* \* \* \*